United States Patent [19] [11] 3,935,749
Groves [45] Feb. 3, 1976

[54] STARTING APPARATUS

[75] Inventor: Karl Groves, Brecksville, Ohio

[73] Assignee: VLN Corporation, Cleveland, Ohio

[22] Filed: Sept. 5, 1974

[21] Appl. No.: 503,373

[52] U.S. Cl. .......................... 74/6; 192/42; 192/45; 192/104 C

[51] Int. Cl.[2] .......................F02N 11/00; F16D 41/00; F16D 43/04

[58] Field of Search ............ 74/6, 7 R, 7 A; 192/42, 192/45, 104 B, 104 C

[56] References Cited

UNITED STATES PATENTS

| | | | |
|---|---|---|---|
| 1,114,716 | 10/1914 | Annable | 192/42 |
| 1,147,126 | 7/1915 | Smith | 192/42 |
| 2,245,437 | 6/1941 | Dyer | 74/7 A |
| 2,429,091 | 10/1947 | Dodge et al. | 192/104 C |
| 3,701,285 | 10/1972 | Toulier | 74/6 |

*Primary Examiner*—Allan D. Hermann

[57] ABSTRACT

An improved starting apparatus is utilized in association with a starting motor to effect rotation of an engine ring gear. The starting apparatus includes a pinion gear which is movable from a disengaged position to an engaged position in meshing engagement with an engine ring gear. If the pinion gear teeth and ring gear teeth are misaligned as the pinion gear is moved toward the engaged position, a plurality of balls cooperate with surfaces of grooves extending transversely to the path of movement of the pinion gear to effect rotational movement of the pinion gear relative to the engine ring gear. This pinion gear rotation moves the pinion gear teeth into alignment with the engine ring gear teeth and thereby enables the pinion gear to move into meshing engagement with the ring gear. Once the ring and pinion gears have moved into meshing engagement, a starting motor is energized and drive surfaces of the grooves cooperate with the balls to transmit drive forces from the starting motor to the pinion gear to thereby effect rotation of the engine ring gear. Upon starting of the engine, the ring gear accelerates to a greater speed than the speed at which the pinion gear is rotated. As this occurs, sloping ramp surfaces of the grooves cause the balls to move out of the grooves.

13 Claims, 5 Drawing Figures

STARTING APPARATUS

BACKGROUND OF THE INVENTION

This invention relates generally to an apparatus for use in an engine starting system and more specifically to an engine starting apparatus having a ball drive arrangement for transmitting forces between a drive member and a pinion gear which engages an engine ring gear.

There are many known devices for use in engine starting systems to transmit forces to effect a starting of the engine. Some of these known starting devices are disclosed in U.S. Pat. Nos. 3,593,697; 3,304,790; 1,208,115; and 1,178,788.

Although these known starting devices have been more or less satisfactory in their mode of operation, at least some of them have relied upon pinion gear movement on a helix to achieve rotational and axial movement of the pinion gear relative to a drive shaft when the pinion gear teeth are in a misaligned relationship with the teeth on an engine gear. These systems require a relatively high initial actuating force. After a period of service, abutments become worn and are ineffective to move the pinion gear in the desired manner. This wear is due to deterioration of lubricants, and the picking up of metal, soil or other foreign particles on sliding surfaces. In addition, with certain known starting systems severe damage can occur to the starter drive arrangement when the starting motor remains energized after the engine is started. Finally, it is extremely difficult, if not impossible, to hold relatively small pinion pitch diameter tolerances due to an accumulation of shaft, inner sleeve, outer sleeve and gear cutting tolerances or shaft, sleeve, outer helix, inner helix and spur gear cutting tolerances with certain known engine starting systems.

SUMMARY OF THE PRESENT INVENTION

The present invention provides a new and improved engine starting system which overcomes the aforementioned weaknesses of known starting systems by utilizing a ball drive arrangement to transmit forces between a driven input member and a pinion gear. With this ball drive arrangement, reliance is placed upon ball rotation rather than sliding of helical surfaces relative to each other so that relatively little lubricant is required and misalignment due to bushing wear has little or no detrimental effect on operation of the ball drive arrangement. Since ball rotation is relied upon in the drive arrangement, relatively little force is required to effect alignment of the pinion gear teeth with the engine gear teeth. This alignment is promoted by the fact that the ball drive arrangement can have a larger rotational movement of the pinion gear for each unit of axial movement than can be obtained with known helical gear teeth driving arrangements. Finally, the ball drive arrangement can hold a closer pinion gear pitch diameter tolerance than has previously been commercially possible since in the ball drive arrangement the total tolerance is determined by shaft, sleeve and gear cutting tolerance. Of course, the closer pinion pitch diameter tolerances tend to prolong gear operating life.

In one specific embodiment of the present invention, the ball drive arrangement utilized to transmit forces between an input member and a pinion gear in an engine starting system includes a ball which is disposed in an elongated groove. The groove has a central axis which is skewed relative to the path of movement of the pinion gear into engagement with teeth of an engine gear. Upon movement of the pinion gear from a disengaged condition toward an engaged condition with the teeth of the pinion gear in a misaligned relationship with the teeth of the engine gear, an elongated edge portion of the groove cooperates with the ball to effect rotational movement of the pinion gear relative to the engine gear. This rotation moves the teeth on the pinion gear into alignment with the teeth on the engine gear and the pinion gear can then be moved axially into engagement with the engine gear. The drive gear may advantageously be support for axial and rotational movement relative to a support sleeve by a plurality of bearing balls.

Once the teeth on the pinion and engine gears have been moved into meshing engagement, the ball and a portion of the surface of the groove cooperate to transmit drive forces between the input member and the pinion gear. These drive forces effect rotation of the engine gear. Upon starting of the engine, the engine gear rotates the pinion gear at a relatively high speed and a ramp surface portion of the groove effects movement of the ball out of the groove to enable the pinion gear to be rotated relative to the input member by the engine gear. The ramp portion of the groove can be either a transversely extending section of the groove or a longitudinally extending side portion of the groove. Once the ball is moved out of the groove and the pinion gear is being rotated at a relatively high speed by the engine gear, centrifugal force will hold the ball out of engagement with the pinion gear to prevent unnecessary wear.

Accordingly, it is an object of this invention to provide a new and improved engine starting apparatus which includes a ball drive arrangement having a ball which cooperates with a surface to effect rotational movement of a pinion gear relative to an engine gear upon movement of the pinion gear from a disengaged condition toward an engaged condition with the teeth on the pinion and engine gears in a misaligned relationship.

Another object of this invention is to provide a new and improved apparatus as set forth in the next preceding object and wherein a second surface cooperates with the ball to effect rotational movement of the pinion and engine gears under the influence of a starting motor when the p'nion engine gears are in an engaged condition.

Another object of this invention is to provide a new and improved apparatus for use in an engine starting system wherein the apparatus includes a ball which cooperates with a surface of a groove to effect rotational movement of pinion and engine gears under the influence of forces transmitted from a starting motor and wherein the ball cooperates with a second surface portion of the groove to effect disengagement of the ball from the groove upon starting of the engine to thereby render the ball ineffective to transmit force between the pinion gear and the starting motor.

Another object of this invention is to provide a new and improved apparatus for use in an engine starting system wherein the apparatus includes a plurality of bearing balls which support a pinion gear for axial and rotational movement relative to a support member.

BRIEF DESCRIPTION OF THE DRAWINGS

The foregoing and other objects and features of the present invention will become more apparent upon a consideration of the following description taken in connection with the accompanying drawings wherein.

DESCRIPTION OF SPECIFIC PREFERRED EMBODIMENTS OF THE INVENTION

Figure 1:
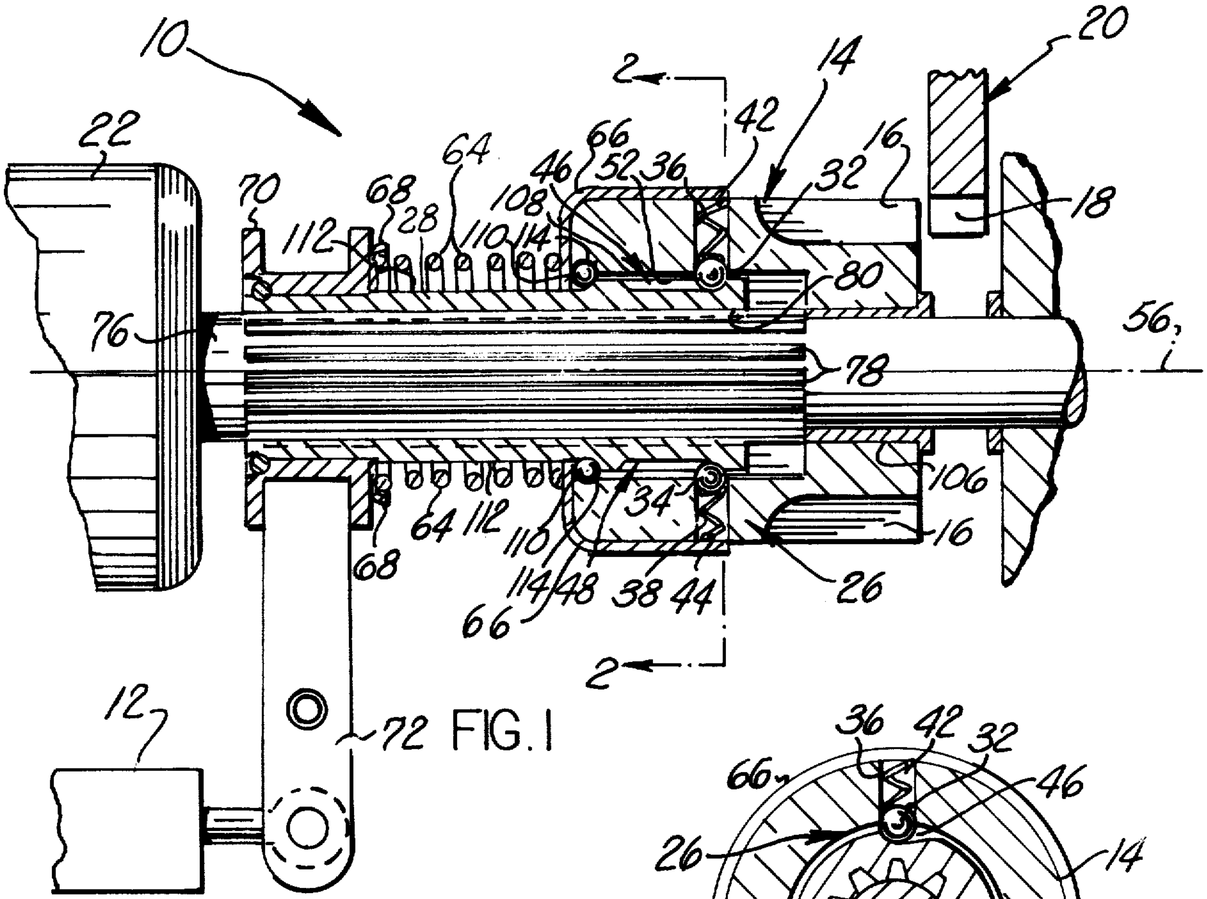
FIG. 1 is a partially broken away sectional view of an engine starting system having a ball drive arrangement constructed in accordance with the present invention to transmit drive forces between an input member and pinion gear.

An engine starting system 10 includes a solenoid 12 which is energized to effect axial movement of a pinion or drive gear 14 from the disengaged position of FIG. 1 toward an engaged position in which teeth 16 on the pinion gear are disposed in meshing engagement with teeth 18 on an engine ring gear 20. When the pinion gear 14 has been moved into meshing engagement with the engine ring gear 20, a starter motor 22 is energized to effect rotation of the pinion gear and the engine ring gear 20. Rotation of the engine gear 20 effects starting of the associated engine (not shown) in a well known manner. Shortly after starting of the engine, the starter solenoid 12 is deenergized to effect axial movement of the pinion gear 14 from the engaged condition to the disengaged condition.

Figure 2:
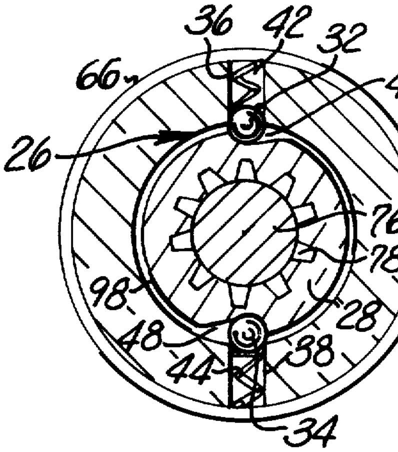
FIG. 2 is a sectional view, taken generally along the line 2—2 of FIG. 1, illustrating the relationship between the ball drive arrangement, the input member and the pinion gear.

In accordance with a feature of the present invention, an improved ball drive arrangement 26 (see FIGS. 1 and 2) is utilized to transmit force between an internally splined input sleeve 28 and the pinion gear 14. The ball drive arrangement includes a pair of identical spherical balls 32 and 34 which are disposed in radially extending holes 36 and 38 formed in the pinion gear 14. Coil springs 42 and 44 urge the balls 32 and 34 radially inwardly into engagement with identical tracks or grooves 46 and 48 formed in the cylindrical outer surface of the sleeve 28.

The groove 46 (see FIG. 3) is provided with a channel portion 52 having a longitudinally extending central axis 54 which is skewed at an acute angle relative to a central axis 56 of the sleeve 28. When the pinion gear 14 is moved from the disengaged position of FIG. 1 toward an engaged position with the gear teeth 16 in a misaligned relationship with the engine gear teeth 18, the resulting abutting engagement between the two sets of teeth prevents axial movement of the pinion gear 14 with the sleeve 28 even though the starter solenoid 12 will continue to move the sleeve axially. Due to the skewed relationship of the channel 52 relaive to the central axis 56 of the sleeve, a first longitudinally extending side surfaces 60 of the channel 52 cooperates with the ball 32 to effect rotation of the pinion gear 14 relative to the ring gear 20 about the axis 56 as the sleeve 28 continues to move axially relative to the pinion gear. As this is occurring, the ball 32 rolls along the surface 60 and a spring 64 compressed between a retainer 66 on the pinion gear 14 and a retainer 68 disposed adjacent to a collar 70. The collar 70 is moved by a pivotal lever 72 upon energization of the solenoid 12.

As soon as the helical camming action between the ball 32 and the surface 60 has rotated the pinion gear 14 through an angular distance sufficient to move the pinion gear teeth 16 into meshing alignment with the ring gear teeth 18, the compressed spring 64 moves the pinion gear axially into meshing engagement with the ring gear 20. The starting motor 22 is then energized in a known manner to rotate a drive shaft 76. External splines 78 on the drive shaft 76 engage internal splines 80 on the sleeve 28 to rotate the sleeve 28 with the drive shaft about the central axis 56.

Figure 3:
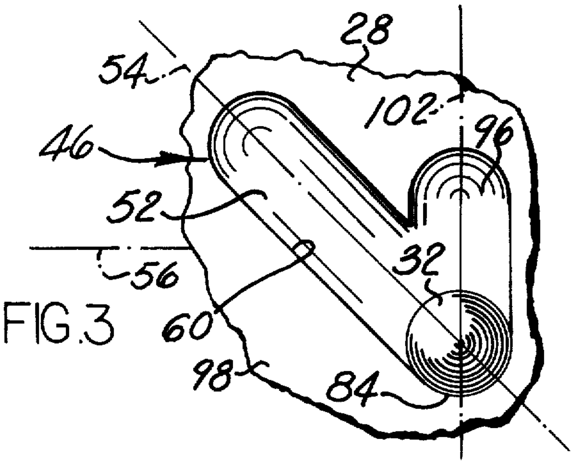
FIG. 3 is an enlarged plan view of a groove utilized in the ball drive arrangement.
Figure 4:
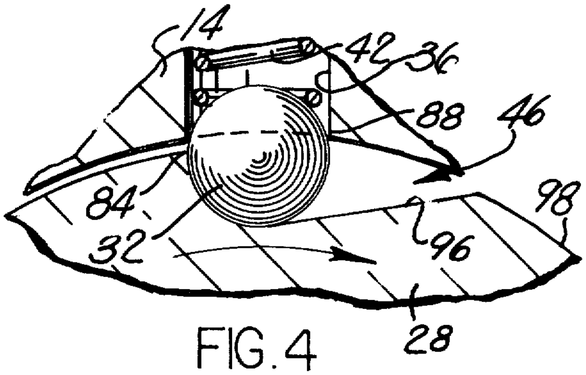
FIG. 4 is an enlarged fragmentary sectional view illustrating the relationship between a ball of the drive arrangement, an input member, and a pinion gear during driving of the pinion gear under the influence of drive forces transmitted through the ball.

As the sleeve 28 rotates, an arcuate second or drive surface portion 84 formed at the end of the channel 52 (see FIGS. 3 and 4) causes the ball 32 to rotate in a clockwise direction (as viewed in FIG. 4). This rotational movement of the ball 32 is transmitted to the ring gear 14 by abutting engagement of a corner surface 88 of the hole 36 in the ring gear 14 with a side of the ball opposite from the surface 84 (see FIG. 4). Therefore the pinion gear 14 is rotated clockwise (as viewed in FIG. 4) by the starting motor 22 under the influence of drive forces transmitted from the sleeve 28 through the ball 32. Of course, this rotational movement of the pinion gear 14 rotates the engine ring gear 20 to initiate starting of the engine in a known manner. It should be noted that the driving relationship between the ball 32 and the surface 34 is promoted by the fact that the surface 84 engages the ball at a location radially outwardly of the center of the ball. Thus, the groove 46 has a maximum depth which is greater than the radius of the ball 32.

Upon starting of the engine, the ring gear 20 accelerates to a greater rotational speed than the rotational speed of the of the pinion gear 14. In order to prevent damage to the starting system 10 under the influence of forces applied to the pinion gear 14 by the ring gear 20 upon starting of the engine, the ball 32 is moved out of the groove 46 to the retracted position illustrated in FIG. 5. When the ball 32 is in the retracted position it is ineffective to transmit drive forces between the sleeve 28 and pinion gear 14.

Figure 5:
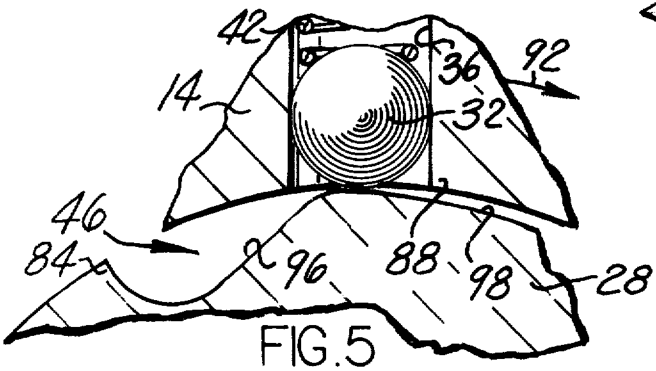
FIG. 5 is an enlarged framgentary sectional view, generally similar to FIG. 4, illustrating the relationship between the ball and the groove of FIG. 3 immediately after disengagement of the ball from the groove upon starting of the engine.

Upon starting of the engine the ring gear 20 accelerates the pinion gear 14 in the direction of the arrow 92 in FIG. 5. As the pinion gear 14 accelerates and its rotational speed exceeds the rotational speed of input sleeve 28, the ball 32 rolls up a ramp or third surface 96 into engagement with a cylindrical outer surface 98 of the sleeve 28. As the ball 32 moves out of the groove 46, it compresses the spring 42 and moves axially into the cylindrical hole 36. As the ring gear 20 continues to be accelerated by the engine, the speed of rotation of the pinion gear 14 increases an centrifugal force causes the ball 32 to move further into the cylindrical hole 36 and away from the outer surface 98 of the sleeve 28. This prevents unnecessary wear on the groove 46 during subsequent rotation of the pinion gear 14 by the engine gear 20.

Shortly after the engine starts, the solenoid 12 is deenergized to effect pivotal movement of the lever 72 to slide the shaft 28 toward the left (as viewed in FIG. 1). This movement of the shaft 28 disengages the pinion gear 14 from the engine gear 20. Once the pinion engine gears 14 and 20 have been disengaged, the rate of rotation of the pinion gear 14 decreases until it approximates the rate of rotation of the sleeve 28. As this is occurring, the spring 42 moves the ball 32 back into the groove 46 so that the ball and groove assume the relationship shown in FIG. 3 and are ready for a subsequent starting operation.

The pinion gear 14 is advantageously supported for axial and rotational movement relative to the support sleeve or shaft 28 by a bearing assembly 108. The bearing assembly 108 includes a plurality of bearing balls 110 which are disposed in an annular array between the drive gear 14 and the support member 28. Each of the balls 110 has a spherical outer surface which is disposed in rolling engagement with a cylindrical outer surface 112 of the support member 28. In addition, the spherical outer surfaces of the bearing balls 110 are disposed in rolling engagement with an annular groove 114 formed in the end portion of the pinion gear.

Due to the fact that there is rolling engagement between the bearing balls 110 and the surfaces of the support sleeve 28 an pinion gear 14, the pinion gear can be easily shifted axially along the support sleeve upon movement of the teeth 16 on the pinion gear 14 into abutting engagement with the teeth 18 on the engine gear 20. The bearing balls 114 also support the pinion gear 14 for rotational movement relative to the sleeve 28 under the influence of the drive balls 32 and 34. Frictional resistance to movement of the pinion gear 14 relative to the support sleeve 28 tends to be minimized by the rolling action of the bearing balls 110. Although ony two bearing balls 110 have been shown in FIG. 1, in one specific embodiment of the invention the bearing assembly 108 included 26 bearing balls 110 disposed in an annular array between the cylindrical surface 112 and annular pinion gear groove 114.

In the embodiment of the invention illustrated in FIG. 3, the ramp 96 is formed in a portion of the groove 46 which extends transversely to the channel 42 and has a central axis 102 which extends perpendicularly to the sleeve axis 56. However, it is contemplated that the ramp surface 96 could, to facilitate manufacturing of the starting system 10, be formed in a side portion of the channel 52 opposite from the surface 60. If the groove 46 was formed in this manner to expedite manufacturing operations, the channel 52 could have a cross-sectional configuration illustrated in FIGS. 4 and 5 throughout the length of the channel. In addition, in the embodiment of the invention illustrated in FIG. 1, a cylindrical sleeve bearing 106 slidably engages a non-splined portion of the starter motor output shaft 76 to rotatably support the pinion gear 14 for axial movement between the disengaged and engaged conditions. It is contemplated that it may be desired to provide the sleeve 28 with a cylindrical extension upon which the pinion gear 14 is slidably disposed rather than slidably mounting the pinion gear upon the starting motor drive shaft 76.

Although only the cooperation between the ball 32 and the groove 46 has been fully described herein, it should be understood that the ball 34 and groove 48 cooperate in the same manner as do the ball 32 and groove 46. It should also be understood that the two balls 32 and 34 cooperate in the same manner and at the same time with their associated grooves 46 and 48. Thus, when the ball 32 is cooperating with the surface portion 60 of the channel 52 to effect helical movement of the pinion gear 14, the ball 34 is cooperating in a similar manner with a similarly shaped portion of the groove 48. When the ball 32 is transmitting drive forces from the sleeve 28 to the pinion gear 14 in the manner illustrated in FIG. 4, the ball 34 is also transmitting drive forces between the sleeve and the pinion gear. Finally, when the ball 32 is rolling up the ramp 96 upon starting of the engine, the ball 34 is rolling up a similarly shaped ramp.

In view of the foregoing description it can be seen that the present invention provides a new and improved engine starting apparatus 10 which utilizes a ball drive arrangement 26 to transmit forces between a driven input shaft 28 and a pinion gear 14. The ball drive arrangement 26 places reliance upon rotation of the balls 32 and 34 so that relatively little lubricant is required and misalignment due to wear of the bushing 106 has little or no detrimental effect on operation of the ball drive arrangement. Relatively little force is required to effect alignment of the pinion gear teeth 16 with teeth 18 as the pinion gear 14 is moved from the disengaged position of FIG. 1 toward the engaging position. This gear tooth alignment is promoted by the fact that the ball drive arrangement 26 provides a relatively large increment of rotational movement of the pinion gear 14 for each unit of axial movement between the shaft 28 and the pinion gear. Finally, the ball drive arrangement 26 can hold a closer pinion gear pitch diameter tolerance than has previously been commercially possible since in the ball drive arrangement 26 the total tolerance is determined by the tolerance between the shaft sleeve 28 and tolerances in forming the pinion gear teeth 16. Of course, the closer pinion pitch diameter tolerances tend to prolong gear operating life.

Having described a specific preferred embodiment of the invention, the following is claimed:

1. An apparatus for use in an engine starting system having a starting motor for effecting rotation of an engine gear, said apparatus comprising a drive gear movable between a disengaged condition and an engaged condition in meshing engagement with the engine gear, means for effecting movement of the drive gear from the disengaged condition to the engaged condition, a ball, first surface means for cooperating with said ball to effect rotational movement of said drive gear relative to the engine gear upon movement of said drive gear from the disengaged condition toward the engaged condition with teeth on said drive and engine gears in a misaligned relationship, and second surface means for cooperating with said ball to effect rotational movement of said drive and engine gears under the influence of said starting motor when said drive gear is in the engaged condition.

2. An apparatus as set forth in claim 1 further including third surface means for effecting movement of said ball from a first position in abutting engagement with said second surface means to a second position spaced apart from said second surface means upon starting of the engine.

3. An apparatus as set forth in claim 2 wherein said first, second and third surface means cooperate to define a single groove in which said ball is disposed when said drive gear is in said disengaged condition.

4. An apparatus as set forth in claim 1 wherein said first and second surface means at least partially define a single groove, said first surface means partially defining a longitudinally extending portion of the groove having a longitudinal axis extending at an acute angle to the direction of movement of said drive gear between the disengaged and engaged conditions, said second surface means partially defining one end of the longitudinally extending portion of the groove.

5. An apparatus as set forth in claim 4 further including means for disengaging said ball from said second surface means upon starting of the engine to prevent the transmittal of force between the starting motor and drive gear upon starting of the engine.

6. An apparatus as set forth in claim 1 wherein said means for effecting movement of said drive gear from the disengaged condition to the engaged condition includes an axially extending support member upon which said drive gear is disposed, and means for moving said support member axially from a first position to a second position to effect movement of said drive gear from the disengaged condition toward the engaged condition, said apparatus further including bearing means disposed between said drive gear and said support member for supporting said drive gear for rotational movement about said support member and for supporting said drive gear for axial movement along said support member, said bearing means including an annular array of bearing balls having spherical outer surfaces disposed in rolling engagement with said support member.

7. An apparatus for use in an engine starting system having a starting motor for effecting rotation of an engine gear, a support member having a central axis, a drive gear mounted on said support member, said drive gear being movable axially along the support member and being rotatable about the central axis of said support member, means for moving said support member axially between a first position in which said drive gear is disengaged from the engine gear and a second position in which said drive gear is disposed in engagement with the engine gear, means for effecting rotational movement of said drive gear relative to said engine gear and said support member upon movement of said support member from the first position toward the second position with the teeth on said drive and engine gears in a misaligned relationship, and a plurality of bearing balls disposed between said drive gear and said support member for supporting said drive gear for rotational and axial movement relative to said support means upon movement of said support member toward the second position with the teeth on said drive and engine gears in a misaligned relationship.

8. An apparatus as set forth in claim 7 wherein said means for effecting rotational movement of said drive gear relative to said engine gear includes a plurality of drive balls disposed between said drive gear and said support member at a location spaced apart from said bearing balls.

9. An apparatus for use in an engine starting system having a starting motor for effecting rotation of an engine gear, said apparatus comprising a shaft rotatable about its central axis under the influence of the starting motor, a drive gear operatively connected with said shaft, a ball, groove means for receiving said ball, said groove means being connected with said shaft for rotation therewith and including surface means cooperating with said ball for effecting rotational movement of said drive and engine gears under the influence of forces transmitted from said shaft through said ball and for effecting movement of said ball completely out of said groove means in a direction away from the central axis of said shaft upon starting of the engine to render said ball ineffective to transmit force between said drive gear and shaft.

10. An apparatus as set forth in claim 9 wherein said groove means includes an edge portion which at least partially defines the extent of said groove means, said apparatus further including an arcuate surface disposed in a cylinderical plane and extending away from said edge portion of said groove means and means for urging said ball into engagement with said arcuate surface after said ball has moved completely out of said groove means.

11. An apparatus as set forth in claim 9 further including chamber means disposed outwardly of said groove means for receiving said ball upon movement of said ball out of said groove means.

12. An apparatus for use in an engine starting system having a starting motor for effecting rotation of an engine gear, said apparatus comprising a rotatable drive gear movable between a disengaged position in which said drive gear is spaced apart from the engine gear and an engaged position in which said drive gear is disposed in meshing engagement with the engine gear, a ball, and groove means for receiving said ball, said groove means including first surface means for cooperating with said ball to effect movement of said drive gear relative to the engine gear when said drive gear is out of meshing engagement with the engine gear, second surface means for cooperating with said ball to effect rotational movement of said drive and engine gears under the influence of the starting motor when said drive gear is in the engaged position, and third surface means for effecting disengagement of said ball from said groove means upon starting of the engine.

13. An apparatus as set forth in claim 12 wherein said third surface means is effective to move said ball completely out of said groove means in a direction away from the axis of rotation of said drive gear.

* * * * *